Patented Mar. 23, 1943

2,314,537

UNITED STATES PATENT OFFICE 2,314,537

5 - ETHYL - 5 - PHENYL BARBITURIC COMPOUNDS AND THE METHODS OF PREPARING THESE COMPOUNDS

Henry R. Henze, Austin, Tex., assignor to Eli Lilly and Company, Indianapolis, Ind., a corporation of Indiana No Drawing. Application March 21, 1941, Serial No. 384,592

1 Claim.  (Cl. 260—257)

This invention relates to barbituric compounds and more particularly to 5-ethyl-5-phenyl barbituric compounds and to the methods of preparing these compounds.

The compounds of this invention may be represented by the following formula:

(1) 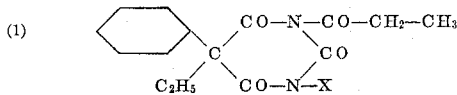

in which X is a member selected from the class which consists of the propionyl radical, hydrogen, the alkali metals, the equivalents of the alkaline-earth metals, ammonium, monoalkyl ammonium, dialkyl ammonium, and alkanol ammonium.

The compositions of this invention are prepared by the following method:

One mole of silver 5-ethyl-5-phenyl barbiturate is reacted with slightly more than 1 mole of propionyl chloride. Preferably, the silver 5-ethyl-5-phenyl barbiturate is dissolved in anhydrous benzene and the propionyl chloride is added to the silver 5-ethyl-5-phenyl barbiturate in an atmosphere which is free from moisture. These conditions may be readily accomplished by introducing the propionyl chloride through a dropping funnel into a flask which has provision for the exclusion of moisture and which contains the silver 5-ethyl-5-phenyl barbiturate. Desirably, the reaction mixture is refluxed for a period of about 14 hours. During this time 1-propionyl-5-ethyl-5-phenyl barbituric acid and 1,3-dipropionyl-5-ethyl-5-phenyl barbituric compound are formed. These compounds may be represented by the following formulas:

(2) 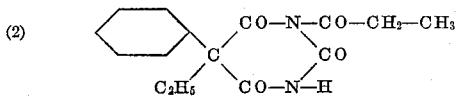

1-propionyl-5-ethyl-5-phenyl barbituric acid

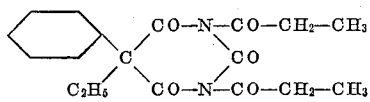

1, 3-dipropionyl-5-ethyl-5-phenyl barbituric compound

The 1-propionyl-5-ethyl-5-phenyl barbituric acid and the 1,3-dipropionyl-5-ethyl-5-phenyl barbituric compound which are formed may be separated from the unreacted starting materials and other reaction products by treatment with a suitable solvent, such as benzene. If benzene is employed during the formation of the desired compound, approximately one half of it may be removed by distillation and the reaction mixture centrifuged. The clear solution, which contains the 1-propionyl-5-ethyl-5-phenyl barbituric acid and the 1,3-dipropionyl-5-ethyl-5-phenyl compound, is evaporated. The 1-propionyl-5-ethyl-5-phenyl barbituric acid and the 1,3-dipropionyl-5-ethyl-5-phenyl barbituric compound may be purified by recrystallization with suitable solvents, such as mixtures of ethyl ether and petroleum ether.

Salts, such as sodium 1-propionyl-5-ethyl-5-phenyl barbiturate, may be produced by treating the 1-propionyl-5-ethyl-5-phenyl barbituric acid with the required base, such as sodium, potassium, or ammonium hydroxide.

A typical example of the preparation of compounds in accordance with this invention is as follows:

*Preparation of 1 - propionyl - 5 - ethyl - 5 - phenyl barbituric acid and 1,3-dipropionyl-5-ethyl-5-phenyl barbituric compound*

Sixteen and fifteen hundredths grams (0.0477 mole) of silver 5-ethyl-5-phenyl barbiturate are placed in a 200 cc. round-bottom flask fitted with a stirrer and mercury seal, a dropping funnel, and a reflux condenser with efficient drying tube. To the barbiturate are added 75 cc. anhydrous benzene followed by 4.85 g. [(0.0525 mole) a 10 percent excess] of propionyl chloride (B. P. 78°–79° C.). The mixture is refluxed for about 14 hours, during which time the 1-propionyl-5-ethyl-5-phenyl barbituric acid and the 1,3-dipropionyl-5-ethyl-5-phenyl barbituric compound are formed. The water is drained from the reflux condenser and about one half of the benzene distilled into another flask through a condenser connected to the first flask. The flask containing the concentrated benzene solution is set aside in a dark place for two days, after which 50 cc. of dry benzene are added. The suspension is transferred to a centrifuge cup and centrifuged. The clear solution, which contains 1-propionyl-5-ethyl-5-phenyl barbituric acid and 1,3-dipropionyl-5-ethyl-5-phenyl barbituric compound, is decanted. 50 cc. of dry benzene are added to the solid residue. The latter is well stirred, the mixture centrifuged, and the benzene decanted. After washing the residue four times with portions of a cubic centimeter of hot ethanol, 6.64 g. of silver chloride are obtained (the quantity calculated as obtainable is 6.84 g.). The alcohol extract is evaporated almost to dryness and water added, causing the precipitation of 3.55 g. of 5-ethyl-5-phenyl barbituric acid.

The benzene solution from the process of centrifugation is evaporated to about 60 cc. About 100 cc. of ligroin are added, causing the separation of white, solid material. Crystallization continues through about 48 hours, at the end of which time 7.75 g. of material, in fractions melting over the range 80°–145° C., are obtained. Six-tenths gram of 5-ethyl-5-phenyl barbituric acid is recovered by recrystallizing the first fraction which separates from benzene. The benzene-soluble fractions are combined and recrystallized from benzene-petroleum ether mixture by dissolving in benzene and adding just enough petroleum ether to cause precipitation. By this method there are obtained 3.65 g. of 1-propionyl-5-ethyl-5-phenyl barbituric acid, melting at about 96°–96.5° C., corrected. This amount represents a yield of 43 percent based on the net weight of silver pheno-barbital which is reacted.

After evaporating to dryness the liquor from the recrystallization of the 1-propionyl-5-ethyl-5-phenyl barbituric acid, 1.7 g. of impure 1,3-dipropionyl-5-ethyl-5-phenyl barbituric compound are obtained. The yield represents 17 percent of the theoretical. When purified by recrystallization from alcohol-water, the compound melts at about 108°–109° C., corrected. Analysis of the 1-propionyl-5-ethyl-5-phenyl barbituric acid reveals 9.75 percent nitrogen compared to the theoretical value of 9.72 percent nitrogen. Analysis of the 1,3-dipropionyl-5-ethyl-5-phenyl barbituric acid reveals 8.23 percent nitrogen compared to the theoretical value of 8.14 percent nitrogen.

What is claimed is:

A method of preparing barbiturate compounds, said method comprising reacting silver 5-ethyl-5-phenyl barbiturate with propionyl chloride and separating the 1-propionyl-5-ethyl-5-phenyl barbituric acid from the 1,3-dipropionyl-5-ethyl-5-phenyl barbiturate.

HENRY R. HENZE.